US011238749B2

(12) United States Patent
Jang et al.

(10) Patent No.: US 11,238,749 B2
(45) Date of Patent: Feb. 1, 2022

(54) METHOD, APPARATUS, AND COMPUTER PROGRAM FOR PROVIDING PERSONALIZED EDUCATIONAL CONTENT

(71) Applicant: RIIID. INC., Seoul (KR)

(72) Inventors: Young Jun Jang, Seoul (KR); Jae We Heo, Seoul (KR)

(73) Assignee: RIIID, INC., Seoul (KR)

( * ) Notice: Subject to any disclaimer, the term of this patent is extended or adjusted under 35 U.S.C. 154(b) by 444 days.

(21) Appl. No.: 16/079,909

(22) PCT Filed: Nov. 8, 2016

(86) PCT No.: PCT/KR2016/012817
§ 371 (c)(1),
(2) Date: Aug. 24, 2018

(87) PCT Pub. No.: WO2017/146344
PCT Pub. Date: Aug. 31, 2017

(65) Prior Publication Data
US 2019/0051204 A1 Feb. 14, 2019

(30) Foreign Application Priority Data
Feb. 25, 2016 (KR) .................. 10-2016-0022615

(51) Int. Cl.
*G09B 7/04* (2006.01)
*G06Q 50/10* (2012.01)
(Continued)

(52) U.S. Cl.
CPC .............. *G09B 7/04* (2013.01); *G06F 16/335* (2019.01); *G06F 16/9027* (2019.01);
(Continued)

(58) Field of Classification Search
CPC ..... G09B 7/04; G06F 16/9535; G06F 16/335; G06F 16/9027; G06K 9/6267; G06Q 30/02; G06Q 50/10; G06Q 50/20
See application file for complete search history.

(56) References Cited

U.S. PATENT DOCUMENTS

| 2009/0012800 A1* | 1/2009 | Devarakonda ............ G06F 8/36 |
| | | 705/301 |
| 2014/0272914 A1 | 9/2014 | Baraniuk et al. |

(Continued)

FOREIGN PATENT DOCUMENTS

| JP | 2002-358000 A | 12/2002 |
| KR | 10-2004-0032749 | 4/2004 |

(Continued)

OTHER PUBLICATIONS

International Search Report for PCT/KR2016/012817 dated Jan. 18, 2017, 2 pages.

(Continued)

*Primary Examiner* — Malina D. Blaise
(74) *Attorney, Agent, or Firm* — Adsero IP

(57) ABSTRACT

The present disclosure relates to a method for providing a customized educational content by an electronic device, the method including: a step a of generating a set of tags of sub-learning elements by listing a learning element of a particular subject in a tree structure, and designating analysis groups of the tags; a step b of generating structural information of a question by indexing an incorrect-answer tag to each of distractors of the question; a step c of inquiring about a result of a user test so as to calculate a user conquest rate for each of the analysis groups; and a step d of providing a user-customized question by using at least one of the structural information of the question and the user conquest rate.

4 Claims, 3 Drawing Sheets

(51) Int. Cl.
*G06Q 30/02* (2012.01)
*G06Q 50/20* (2012.01)
*G06F 16/335* (2019.01)
*G06F 16/9535* (2019.01)
*G06F 16/901* (2019.01)
*G06K 9/62* (2006.01)

(52) U.S. Cl.
CPC ....... *G06F 16/9535* (2019.01); *G06K 9/6267* (2013.01); *G06Q 30/02* (2013.01); *G06Q 50/10* (2013.01); *G06Q 50/20* (2013.01)

(56) References Cited

U.S. PATENT DOCUMENTS

| | | | |
|---|---|---|---|
| 2014/0279727 A1* | 9/2014 | Baraniuk | G06N 20/00 706/11 |
| 2015/0206441 A1* | 7/2015 | Brown | G09B 5/00 434/308 |
| 2015/0206442 A1 | 7/2015 | Brown | |

FOREIGN PATENT DOCUMENTS

| | | |
|---|---|---|
| KR | 10-2011-0113295 | 10/2011 |
| KR | 10-2014-0008172 | 1/2014 |
| KR | 10-2015-0102476 | 9/2015 |

OTHER PUBLICATIONS

Office Action dated Nov. 25, 2021 with respect to Chinese App No. 201680082545.9 (w English Translation), 22 pages.

\* cited by examiner

METHOD, APPARATUS, AND COMPUTER PROGRAM FOR PROVIDING PERSONALIZED EDUCATIONAL CONTENT

CROSS-REFERENCE TO RELATED APPLICATION

This application claims priority to and is a 35 U.S.C. § 371 national phase application of PCT/KR2016/012817 (WO2017/146344), filed Nov. 8, 2016 entitled "METHOD, APPARATUS, AND COMPUTER PROGRAM FOR PROVIDING PERSONALIZED EDUCATIONAL CONTENT", which application claims priority to and the benefit of Korean Patent Application No. 10-2016-0022615, filed Feb. 25, 2016, the disclosures of which are incorporated herein by reference in their entirety.

TECHNICAL FIELD

The present disclosure relates to a method and an apparatus for providing a user-customized educational content in an electronic device, and a computer program therein. More particularly, the present disclosure relates to a method and an apparatus for providing a user-customized educational content, and a computer program, wherein structural information of a question can be generated using a tag for a learning theme or the intention of writing a question and a learning effect can be increased in view of a user conquest rate for a question type.

BACKGROUND ART

Until now, typically, an educational content has been provided in a package form. For example, a collection of questions printed on paper contains at least 700 questions per book. Also, an online or offline lecture is configured such that the amount of learning, which is to progress for at least one month in a unit of one or two hours, is collected therein, and is sold at a time.

However, since students involved with education are different from one another in their weak learning themes and their weak question types, there is a need for a customized content rather than a package-type content. This is because it is more efficient for a student to selectively learn a weak question type of his/her weak learning theme than in a case where he/she works out all 700 questions of a collection of questions.

However, it is highly difficult for students who receive education to understand their weak points for themselves. Further, the conventional educational industry, such as institutions and publishing companies, analyze students and questions, depending on subjective experiences and intuition, and thus, it is not easy for them to provide optimized questions to individual students.

As described above, in the conventional educational environment, it is not easy to provide a customized content which enables persons who receive education to achieve their learning results in the most efficient manner, and thus, a problem may arise in that students lose their sense of achievement and interests in package-type educational contents.

DETAILED DESCRIPTION OF THE INVENTION

Technical Problem

The objective of the present disclosure is to solve the above-mentioned problems. More specifically, an aspect of the present disclosure is to provide a method and an apparatus which can detect each user's weak particulars in a theme of a question, the intention of writing a question, and/or a question type so as to provide a user-customized educational content capable of increasing a learning effect in the most efficient manner.

Technical Solution

In accordance with an aspect of the present disclosure, there is provided a method for providing a customized educational content by an electronic device, the method including: a step a of generating a set of tags of sub-learning elements by listing a learning element of a particular subject in a tree structure, and designating analysis groups of the tags; a step b of generating structural information of a question by indexing an incorrect-answer tag to each of distractors of the question; a step c of inquiring about a result of a user test so as to calculate a user conquest rate for each of the analysis groups; and a step d of providing a user-customized question by using at least one of the structural information of the question and the user conquest rate.

Meanwhile, in accordance with another aspect of the present disclosure, there is provided an electronic device for providing a customized educational content, the electronic device including: a first module configured to generate a set of tags of sub-learning elements by listing a learning element of a particular subject in a tree structure; a second module configured to designate analysis groups of the tags and generate structural information of a question by indexing an incorrect-answer tag to each of distractors of the question; a third module configured to inquire about a result of a user test and calculate a user conquest rate for each of the analysis groups; and a fourth module configured to provide a user-customized question by using at least one of the structural information of the question and the user conquest rate.

Further, in accordance with still another aspect of the present disclosure, there is provided a computer program recorded in a computer-readable recording medium in order to perform processing for providing a customized educational content in an electronic device, the computer program including: a function of generating a set of tags of sub-learning elements by listing a learning element of a particular subject in a tree structure, and designating analysis groups of the tags; a function of generating structural information of a question by indexing an incorrect-answer tag to each of distractors of the question; a function of inquiring about a result of a user test so as to calculate a user conquest rate for each of the analysis groups; and a function of providing a user-customized question by using at least one of the structural information of the question and the user conquest rate.

Advantageous Effects

The present disclosure can recommend, as a user-customized question, a question which is similar to a theme of a question, the intention of writing a question, and/or a question type in which a user is weak, so as to provide an educational content of a type optimized for an individual user.

Further, the present disclosure can provide the user with more accurate analysis data on his/her weak points, so as to enable the user to understand his/her current state and draw up an efficient learning plan.

MODE FOR CARRYING OUT THE INVENTION

Figure 1:
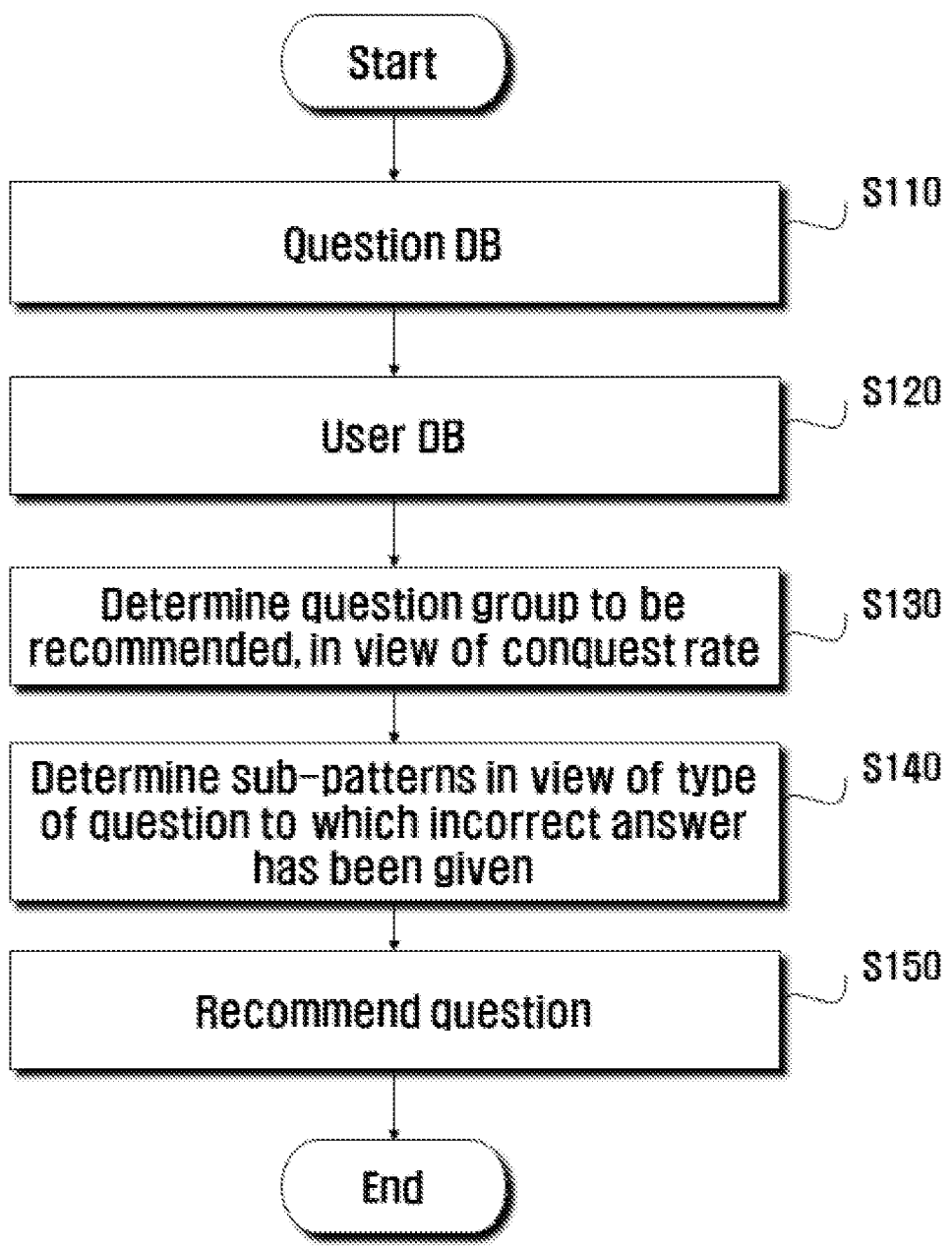
FIG. 1 is a flowchart for explaining a process of providing a user-customized educational content according to an embodiment of the present disclosure.

The present disclosure is not limited to details of the embodiments described below, and it will be apparent to apply various modifications to the embodiments without departing from the technical subject matter of the present disclosure. Also, in describing the embodiments, a description of the technical details, which are well known in the technical field of the present disclosure and are not directly related to the technical subject matter of the present disclosure, will be omitted.

Meanwhile, in the accompanying drawings, the same reference numerals will designate the same elements. Further, in the accompanying drawings, some elements may be exaggerated, omitted, or schematically illustrated. This is for clarifying the subject matter of the present disclosure by omitting an unnecessary description which is not related to the subject matter thereof.

As described above, a need for a user-customized question has always existed. This is because students desire to solve questions, which allow them to achieve the highest learning effects, and study at high efficiency for a limited time length.

In such a situation, conventionally, a scheme for evaluating the level of a student in view of only the percentage of correct answers to questions, that is, whether the student gives a correct or incorrect answer to a particular question and recommending an appropriate question to the student has been adopted. For example, when a certain student frequently gives an incorrect answer to a question of which a theme is "verb tense" in English, it is possible to follow a scheme for regarding the relevant student as being weak in "verb tense" and recommending, to the student, another question of which a theme is verb tense.

However, an actual examination question is not set in a simple manner. This is because comprehensive thinking ability in a relevant subject is evaluated in an important examination.

For example, in a multiple choice question, with the intention of writing a question, an examination writer may configure multiple choices in view of various aspects, including whether students can understand the intention of writing a question, whether the students can distinguish between easily confusable concepts, and the like. When considering this situation, it possible to come to the conclusion that a user's weak point needs to be analyzed in view of not only whether the user gives a correct or incorrect answer to a particular question but also the intention of writing a question and configuration types of choices.

For example, when two students give incorrect answers to the same question but select different choices, a weak point of each of the student needs to be differently analyzed. Both of the students fail to understand the intention of writing the relevant question, and there is a high probability that they do not fully know themes of their selected choices.

As another example, consideration is given to a case in which a certain student does not fully know "verb tense" and "gerund". When the student gives an incorrect answer to a question which includes a choice of "gerund" but asks for "verb tense", according to the conventional scheme, it is impossible to check the state of the student who needs to learn about gerund. Meanwhile, when a student who knows both "gerund" and "verb tense" gives a correct answer to the same question, according to the conventional scheme, it is also impossible to check the state of the student who does not need to learn about gerund.

The present disclosure has been devised to solve the above-mentioned problems.

An embodiment of the present disclosure makes it possible to index the intention of writing a question and/or a theme of a question for each question and/or for each choice of a question, so as to more accurately understand structural information of the question. Through this configuration, a user's weak point can be accurately analyzed, and a question of a type, which can increase a learning effect in the most efficient manner, can be recommended.

More specifically, a data analysis system according to an embodiment of the present disclosure may list a learning element of a particular subject to a minimum unit in a tree structure, may generate metadata which subdivides a learning element of a question so as to explain the same, and may utilize the generated metadata as a tag. Particularly, according to an embodiment of the present disclosure, the tag may be assigned to a distractor of a question, and a tag for the intention of writing the question may be separately managed as a core tag.

Further, the data analysis system according to an embodiment of the present disclosure is characterized in that a user and/or a question is not analyzed for each tag, which is a minimum unit of a learning element, but the tags are grouped in a unit appropriate for analysis so as to analyze the same in an analysis group unit.

According to the above-described scheme, structural information of a question is accurately understood, and it is easy to understand the user's learning state. This is because the user's state information can be managed for each tag of a question that the user has solved. Further, according to an embodiment of the present disclosure, the user's learning state may be calculated in a unit appropriate for analysis in view of not only whether the user gives a correct or incorrect answer to a particular question but also a pattern of a question to which the user frequently gives an incorrect answer.

Therefore, according to an embodiment of the present disclosure, a user-customized recommended question can be provided in view of a theme and a question pattern in which the user is weak.

Hereinafter, exemplary embodiments of the present disclosure will be described in detail with reference to the accompanying drawings.

FIG. 1 is a flowchart for explaining a process of providing a user-customized educational content according to an embodiment of the present disclosure.

In operation 110, a service server may collect various commercial questions, may structuralize the collected questions in a form appropriate for analysis, may classify the questions into types, and may construct a question database. The question data may include a listening comprehension question and may be of the type of text, image, audio, and/or moving image. The question database will be described in more detail below together with explanation of FIG. 2.

Figure 2:
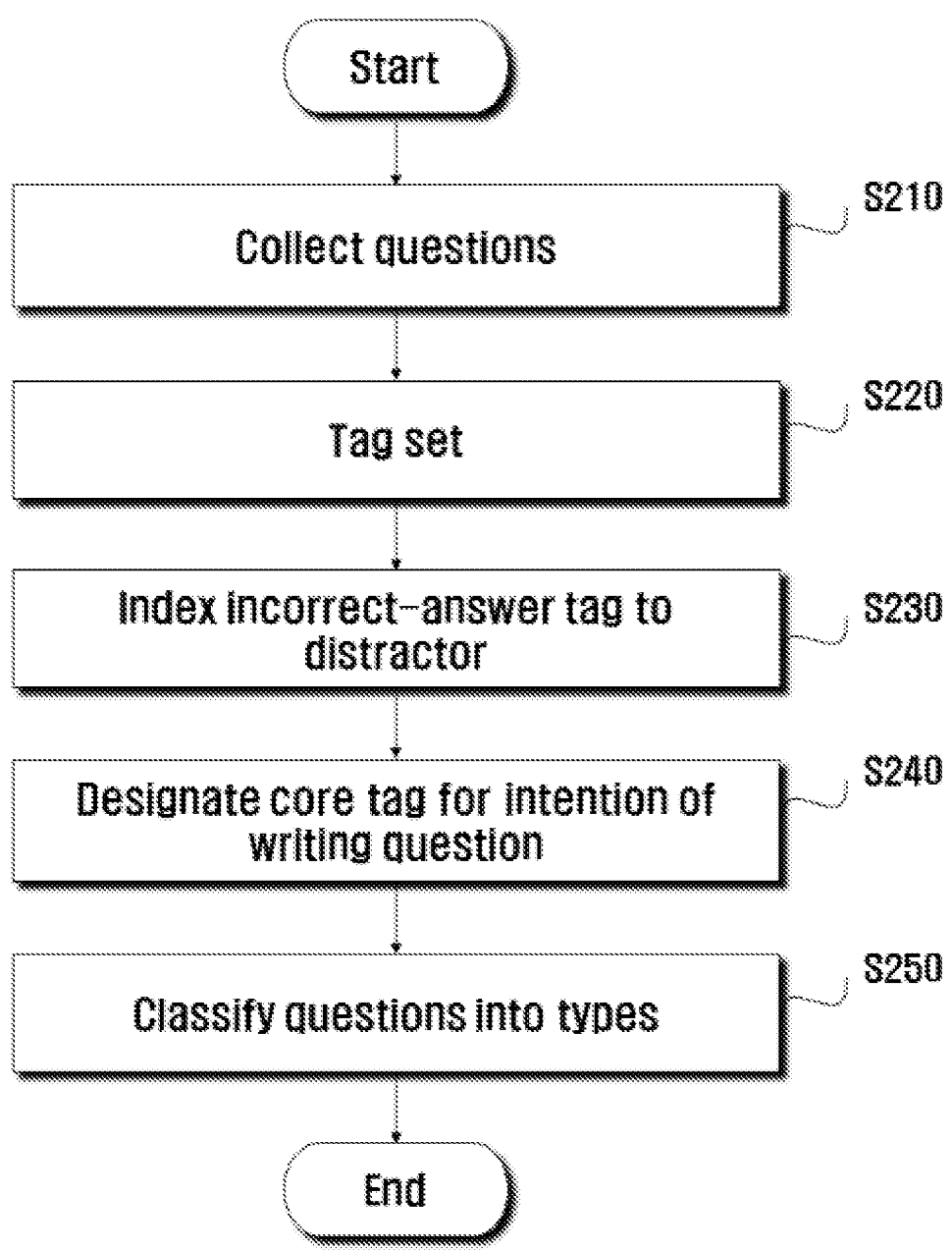
FIG. 2 is a flowchart for explaining a process of tagging a theme of a question and the intention of writing a question, classifying questions into types, and constructing a question database according to an embodiment of the present disclosure.

FIG. 2 is a flowchart for explaining a process of tagging a theme of a question and the intention of writing a question, classifying questions into types, and constructing a question database according to an embodiment of the present disclosure.

In operation 210 of FIG. 2, the service server may collect questions and/or answers, which are included in published or distributed questions or past examination questions, in a form, such as text or an image, that a computer can recognize. The question data may be individually received, or may be collected over the Internet.

Then, the service server may group learning elements and/or themes of respective corresponding subjects into one or more categories, and may index group information to a relevant question, so as to construct a database. In this configuration, the service server may create metadata on group information and/or indexing information, and the metadata may be utilized as tags and may be managed together with each of pieces of question data.

According to an exemplary embodiment of the present disclosure, in particular, the service server may generate metadata, obtained by listing a learning element of the relevant subject in a tree structure, and may index the generated metadata to a choice of a question.

More specifically, in operation 220, the service server may generate a metadata set on a minimum unit learning element by listing the learning element and/or the theme of the relevant subject in a tree structure.

For example, when: a first theme of a particular subject A is classified into A1-A2-A3-A4-A5 . . . ; a second theme which is a sub-theme of the first theme A1 is classified into A11-A12-A13-A14-A15 . . . ; a third theme which is a sub-theme of the second theme A11 is classified into A111-A112-A113-A114-A115 . . . ; and a fourth theme which is a sub-theme of the third theme A111 is classified in the same method, the theme of the relevant subject may be listed in a tree structure.

The metadata in a tree structure may be utilized as a tag for explaining the theme of a question, and a tag may be referred to as a "minimum unit" obtained by classifying, in a tree structure, the learning element of the relevant subject. In the above-described example, a tag corresponds to an element of a set of {A1, A1-A11, A1-A11, A1-A11-A111, A1-A11-A12, . . . }.

Meanwhile, according to an embodiment of the present disclosure, the tag may be managed for each analysis group which is a unit appropriate for analysis of a user and/or a question. This is because it is more appropriate to perform analysis of the user's weak point and/or analysis of a configuration of a question in a unit of a predetermined group, which is a group appropriate for analysis and into which the minimum units are classified, than performing the same for each minimum unit of a learning element.

For example, when a minimum unit obtained by classifying a learning element of English in a tree structure is configured as {verb-tense, verb-tense-past perfect progressive, verb-tense-present perfect progressive, verb-tense-future perfect progressive, verb-tense-past perfect, verb-tense-present perfect, verb-tense-future perfect, verb-tense-past progressive, verb-tense-present progressive, verb-tense-future progressive, verb-tense-past, verb-tense-present, verb-tense-future}, if a user's weak point is analyzed for each of <verb-tense>, <verb-tense-past perfect progressive>, <verb-tense-present perfect progressive>, and <verb-tense-future perfect progressive> which are minimum units of the learning element, the user's weak point is excessively subdivided and thus it is difficult to derive a meaningful analysis result.

This is because learning progresses comprehensively and as a whole under particular classification and thus a student, who does not know past perfect progressive, cannot be expected to understand present perfect progressive. Therefore, according to an embodiment of the present disclosure, a minimum unit of a learning element, that is, a tag, may be managed for each analysis group which is a unit appropriate for analysis, and in the above-described example, an analysis group of tags may correspond to <verb-tense>.

In operation 230 of FIG. 2, the service server may index a tag to a choice of the collected questions.

In particular, according to an embodiment of the present disclosure, a tag may be indexed to a distractor of a multiple choice question rather than all choices thereof. In the present specification, the tag is referred to as an "incorrect-answer tag". The reason why a tag is not separately indexed to a correct-answer choice is because a tag for the intention of writing a question can be separately managed in operation 240.

In operation 240, the service server may check the intention of writing a question in view of choices of the question, and may designate a tag, which can explain the intention of writing the question, as a core tag for the relevant question.

For example, when the intention of writing a particular question is to check whether A123 can be understood in A12 of A1 and choice 3 is a correct answer, according to an embodiment of the present disclosure, incorrect-answer tags may be indexed to distractors 1, 2, and 4.

For example, when choice 1 is related to A1-A11-A111, choice 2 is related to A1-A12-A123, and choice 4 is related to A1-A12-A123 and A1-A11-A111, A1-A11-A111, A1-A12-A123, and A1-A12-A123 and A1-A11-A111 may be designated as incorrect-answer tags, and A1-A12-A123 may be designated as a core tag. In the relevant question, the incorrect-answer tag of choice 2 and the incorrect-answer tag of choice 4 both have a value identical to that of the core tag.

Particularly, as a result of analysis of more than twenty thousand questions in the process of implementation of the present disclosure, a phenomenon in which one distractor from among choices of a multiple choice question necessarily includes only a core tag has been found. Since the intention of writing a question is highly important in the process of writing an examination question, examination writers necessarily include a choice that a student who cannot understand the intention of the question is to select, in distractors except a correct answer. In the above-described example, a distractor, having only an incorrect-answer tag identical to the core tag, is choice 2.

Meanwhile, according to another embodiment of the present disclosure, operation 240 may be modified in such a scheme that a core tag is not indexed to some questions or all questions.

For example, when the intention of writing a particular question lies in a combination of multiple tags rather than one tag, operation 240 may be implemented in such a manner that the core tag is not indexed to some questions. In an example of a question which asks for number, tense, voice, and position of verb together, the intention of writing the question does not lie in one tag, but lies in asking whether all tags are understood.

Meanwhile, when a tag is not indexed to a particular learning element of the relevant distractor but is indexed to a related learning element and a recommend learning element thereof, operation 240 may be implemented in such a manner that the core tag is not indexed to all the questions.

Meanwhile, in operation 250 of FIG. 2, the data analysis system may classify question configuration information into types by using indexing information of the incorrect-answer tags and/or the core tag of a question.

More specifically, the data analysis system may group questions, which have tags belonging to a particular analysis group, as one category, and may group questions, which have an identical core tag among questions of respective groups, as another category.

As another example, the data analysis system may group questions, having an identical core tag, as one category, and may re-group questions, which have a similar configuration of an incorrect-answer tag among the questions of the groups, as one category.

In this configuration, according to an embodiment of the present disclosure, a pattern of a structure of a question may be generated for each category by using a machine learning technique, and may utilize the generated pattern as a context for determining the similarity between questions.

For example, according to the present disclosure, when an incorrect-answer tag A1-A12-A123 is found with a certain degree of probability in multiple questions of a group which has A1-A11-A111 as a core tag, a question having A1-A11-A111 may be analyzed as having a pattern including a choice to which A1-A12-A123 is indexed. As another example, the degree of a probability, with which configurations of all incorrect-answer tags of questions of a particular group have a similarity therebetween, may be detected and questions, which have configurations of incorrect-answer tags that are similar with the relevant probability, may be analyzed as belonging to the group.

To this end, the data analysis system according to the present disclosure may express all the incorrect-answer tags as a vector matrix, may extract a vector variance value of incorrect-answer tags of questions, and may calculate similarities between each two questions. In this configuration, operation 250 may be implemented using a scheme for constructing a matrix by expressing, as a vector, weights of the incorrect-answer tags of the questions, and forming a cluster by grouping questions having a short vector value distance therebetween.

Returning again to the description made with reference to FIG. 1, in operation 120, the data analysis system may generate a user database for analysis of user information. In particular, a user database according to an embodiment of the present disclosure may manage a user conquest rate for a learning element of a relevant subject, for each analysis group of tags. A detailed description of the user data base will be described below together with a description which will be made with reference to FIG. 3.

Figure 3:
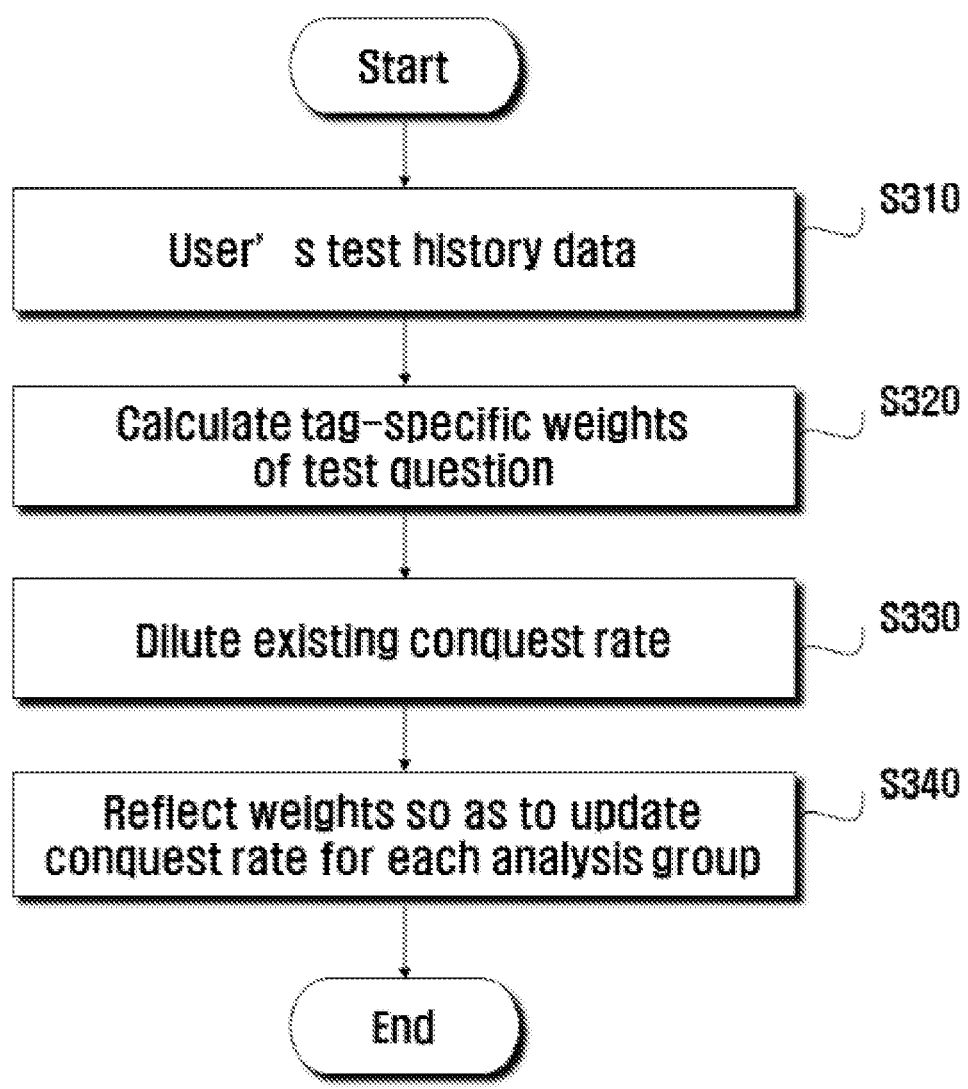
FIG. 3 is a flowchart for explaining a process of calculating a user conquest rate for a theme of a question and the intention of writing a question according to an embodiment of the present disclosure.

FIG. 3 is a flowchart for explaining a process of calculating a user conquest rate for a learning element of a relevant subject according to an embodiment of the present disclosure.

As described above, a user's learning state may not be accurately understood using only the percentage of correct answers to questions having a particular theme, that is, whether the user gives a correct or incorrect answer to a question. Accordingly, the purpose of the present disclosure is to introduce the concept of a conquest rate rather than the percentage of correct answers to questions and analyze a student's learning state.

In operation 310 of FIG. 3, the user's test history may be collected. More specifically, the user may solve multiple questions by using an analysis system according to an embodiment of the present disclosure, and whether the user has given correct or incorrect answers to the questions and which choice the user has selected when he or she has given an incorrect answer to a question may be collected.

To this end, the data analysis system according to an embodiment of the present disclosure may require the user to take a test having specific questions of a type which is frequently written in a particular subject. This configuration is designed to check the user's current level and weak theme before real learning.

When the amount of accumulated data reaches a predetermined amount, the user conquest rate may be calculated for each tag in the relevant subject. The user conquest rate may be calculated by repeating operations 320 to 340.

More specifically, in operation 320, when the user takes a test having particular questions by using the data analysis system, a case in which the user gives a correct answer to a question may be distinguished from a case in which the user gives an incorrect answer to a question so that weights of tags of the test questions may be calculated.

When the user selects a correct choice in a particular question (i.e., when the user gives a correct answer thereto), according to an embodiment of the present disclosure, a tag-specific weight may be calculated by combining weights of incorrect-answer tags of a core distractor and the remaining distractors.

In contrast, when the user fails to select the correct choice in the particular question (i.e., when the user fails to give the correct answer thereto), according to an embodiment of the present disclosure, a tag-specific weight may be calculated by combining weights of incorrect-answer tags of the core distractor and a distractor selected by the user.

A method for calculating a tag-specific weight when the user gives the correct answer to the particular question is described in more detail. A first weight may be assigned to a core distractor, which has only an incorrect-answer tag identical to a core tag of the relevant question, with the same importance as all the remaining distractors. Second weights, which are obtained by distributing the first weight among the remaining distractors in the same ratio, may be assigned to the remaining distractors, respectively. When each of the remaining distractors has multiple incorrect-answer tags, third weights, which are obtained by distributing the second weight among the multiple incorrect-answer tags in the same ratio, may be assigned to the multiple incorrect-answer tags, respectively. A tag-specific weight may be calculated by combining the first, second, and third weights with respect to all the incorrect-answer tags of the question to which the user has given the correct answer.

As an example, a description will be made of a case where a user gives a correct answer to a question in which: a core tag is A; choice 4 is a correct answer; an incorrect-answer tag of choice 1 is A; incorrect-answer tags of choice 2 are A and B; and incorrect-answer tags of choice 3 are C and D.

Since the core tag is A, choice 1, having an incorrect-answer tag identical to the core tag, is a core distractor, and may be assigned a weight with the same importance as the remaining distractors, that is, choices 2 and 3. For example, choice 1 may be assigned a weight of 4, and choices 2 and 3 may be assigned the weight of 4, together. By this configuration, the weight of 4 (a first weight) may be assigned to A which is the incorrect-answer tag of choice 1. The weight of 4 may be distributed between choices 2 and 3 in the same ratio, and thus, each of choices 2 and 3 may be assigned a weight of 2 (a second weight).

Meanwhile, the assigned weight may be distributed between A and B, which are the incorrect-answer tags of choice 2, in the same ratio. The assigned weight may be distributed between C and D, which are the incorrect-answer tags of choice 3, in the same ratio. That is, a weight of 1 (a third weight) may be assigned to each of: A which is the incorrect-answer tag of choice 2; B which is the incorrect-answer tag of choice 2; C which is the incorrect-answer tag of choice 3; and D which is the incorrect-answer tag of choice 3.

Then, a tag-specific weight may be calculated by combining the first, second, and third weights with respect to A, B, C, and D which are all the tags of the relevant question. By this configuration, the tag A may be calculated as having a weight of a total of 5 by combining the first weight of 4 of choice 1 and the third weight of 1 of choice 2. The tags B, C, and D may be assigned the third weight of 1 of choice 2, the third weight of 1 of choice 3, and the third weight of 1 of choice 3, respectively.

In contrast, a method for calculating a tag-specific weight when the user gives the incorrect answer to the particular question is described in more detail. Each of the core distractor, which has only an incorrect-answer tag identical to the core tag, and the distractor selected by the user may be assigned a first weight with the same importance. When the distractor selected by the user has multiple incorrect-answer tags, second weights, which are obtained by distributing the first weight among the multiple incorrect-answer tags in the same ratio, may be assigned to the multiple incorrect-answer tags, respectively. A tag-specific weight may be calculated by combining the first and second weights with respect to the incorrect-answer tags of the core distractor and the distractor selected by the user.

For example, when the user selects choice 2 and gives an incorrect answer to the relevant question in the same question as in the above-described example, since the core tag is A, choice 1, which has an incorrect-answer tag identical to the core tag, is a core distractor, and may be assigned a weight with the same importance as the distractor, that is, choice 2, selected by the user. For example, choice 1 may be assigned a weight of 4, and choice 2 may be assigned the weight of 4 (a first weight).

The weight of 4 of choice 2 may distributed between A and B, which are the incorrect-answer tags of choice 2, in the same ratio and thus a weight of 2 (a second weight) may be assigned to each of A and B which are the incorrect-answer tags of choice 2.

Then, a tag-specific weight may be calculated by combining the first and second weights with respect to the tags A and B of the core distractor and the distractor selected by the user. By this configuration, the tag A may be calculated as having a weight of a total of 6 by combining 4, which is the first weight of choice 1, and 2 which is the second weight of choice 2. Each of the tags B and C may be assigned 2 which is the second weight of choice 2.

Meanwhile, according to another embodiment of the present disclosure, operation 320 may be modified as follows.

According to a modified embodiment of the present disclosure, when a user gives a correct answer to a particular question, a predetermined positive (+) weight may be identically assigned to all choices, and when the user gives an incorrect answer thereto, a predetermined negative (−) weight may be assigned to a choice selected by the user. In this configuration, it is appropriate for evaluation of the user's ability to set the negative weight to be greater than the positive weight. When a choice has multiple tags, an assigned weight may be distributed among the multiple tags in the same ratio, and a weight may be calculated in such a manner as to combine all tag-specific weights.

Meanwhile, according to another modified embodiment of the present disclosure, when a user gives a correct answer to a particular question, a predetermined positive (+) weight may be identically assigned to all tags of the relevant question such that all the tags thereof reflect their tagging frequencies. When the user gives an incorrect answer to the particular question, a weight may be calculated in such a manner as to assign a predetermined negative (−) weight to a tag of a choice selected by the user. In this configuration, it is appropriate for evaluation of the user's ability to set the negative weight to be greater than the positive weight.

In operation 330, a user conquest rate before being changed may be diluted in a predetermined ratio. This configuration considers that the user's learning state may be changed over time in the process of updating a conquest rate.

Meanwhile, in an initial step in which user test history data is not sufficiently collected, the dilution in operation 330 may be performed by roughly calculating a user conquest rate for each analysis unit of a tag.

More specifically, in an initial analysis step, a conquest rate of a particular analysis unit may be calculated by the equation below.

Conquest rate of particular analysis unit=(weight of relevant analysis unit calculated in question to which correct answer has been given)/(weight of relevant analysis unit calculated in question to which correct answer has been given+weight of relevant analysis unit calculated in question to which incorrect answer has been given)

Then, in operation 340, the data analysis system may reflect the tag-specific weights of the relevant question so as to update conquest rates according to analysis groups of the tags.

More specifically, when the user gives the correct answer to the relevant question, the data analysis system may reflect the tag-specific weights, calculated in operation 320, in the diluted user conquest rates of the tags of the question, to which the correct answer has been given, so that a user conquest rate may increase, and may update the user conquest rates by collecting the diluted user conquest rates of the tags, reflecting the tag-specific weights, according to the analysis groups.

For example, if a user conquest rate before being changed for any tag is 15% and a weight of the relevant tag is 5 when a correct answer is given to a question, a user conquest rate after being changed for the relevant tag may be calculated by multiplying each of the numerator and denominator of the user conquest rate before being changed by 0.9 for dilution and adding a weight of 5 to each thereof so that the user conquest rate after being changed for the relevant tag may increase. In this configuration, the user conquest rate before being changed is 15% ($15/100$), and the user conquest rate after being changed is $(15\times0.9+5)/(100\times0.9+5)=19.47\%$ which is increased by 4.47%. Further, for data analysis, the user database may collect the conquest rates according to analysis units of tags and may manage the collected conquest rates.

In contrast, when the user gives an incorrect answer to the relevant question, a user conquest rate may be updated by reflecting the meta tag-specific weights, calculated in operation 320, in the diluted user conquest rate of tags of a core distractor of the question, to which the incorrect answer has been given, and a distractor selected by the user, so that a user conquest rate may decrease.

For example, if a user conquest rate before being changed for any tag is 15% and a weight of the relevant tag is 6 when an incorrect answer is given to a question, a user conquest rate after being changed for the relevant tag may be calculated by multiplying each of the numerator and denominator of the user conquest rate before being changed by 0.9 for dilution and adding a weight of 6 to only the denominator so that the user conquest rate after being changed for the relevant tag may decrease. In this configuration, the user conquest rate before being changed is 15% ($15/100$), and the user conquest rate after being changed is $(15\times0.9)/(100\times0.9+6)=14.06\%$ which is reduced by 0.94%. Further, for data analysis, the user database may collect the conquest rates according to the analysis units of the tags, and may manage the collected conquest rates.

Returning again to the description made with reference to FIG. 1, operations 130 and 140 are an operation of determining a user-customized question by the question database.

According to an exemplary embodiment of the present disclosure, a user-customized question may be recommended using a user conquest rate for each analysis group and/or structural information of a question.

More specifically, in operation 130, the data analysis system according to an embodiment of the present disclosure may determine, as a recommended question group, questions to which tags, belonging to analysis groups having low user conquest rates, are indexed as incorrect-answer tags of the questions.

Further, in operation 140, a question, to which a tag belonging to an analysis group having a low user conquest rate is indexed as a core tag of the question, may be extracted as a core recommended question among questions belonging to the recommended question group. In this configuration, a group to be recommended and/or a core question to be recommended may be determined using the question type classification, that is, the structural information of a question, generated in operation 250 of FIG. 2. Meanwhile, in operation 150, when there is no question to which the core tag is indexed, a question may be randomly recommended in the recommended group.

For example, when an analysis group having a low user conquest rate is A1-A11, questions, to which one of tags {A1-A11-A111, A1-A11-A112, A1-A11-A113, A1-A11-A114, A1-A11-A111-A1111, A1-A11-A111-A1112, . . . } belonging to the relevant analysis group is indexed as an incorrect-answer tag, may be determined as recommended question group, and a question, to which one of {A1-A11-A111, A1-A11-A112, A1-A11-A113, A1-A11-A114, A1-A11-A111-A1111, A1-A11-A111-A1112, . . . } is indexed as a core tag, may be extracted as a core recommended question among questions belonging to the relevant question group.

According to another embodiment of the present disclosure, operation 130 to 150 may be implemented as follows.

For example, in operation 130, the data analysis system may determine, as a recommended group, a group of questions which have a tag, belonging to an analysis group having the lowest user conquest rate, as a core tag. This configuration is designed to provide a question which has a theme, in which a user is the most weak, as the intention of writing the question. Then, in operation 140, the data analysis system may determine a question having a tag configuration similar to that of a question, to which the user has given an incorrect answer, as a recommended question among questions belonging to the recommended group. This configuration is designed to provide a question having a pattern, in which the user is weak, among questions having a theme in which the user is weak.

For example, when an analysis group having a low user conquest rate is A1-A11 and a tag configuration of a question to which the user frequency gives an incorrect answer includes two incorrect-answer tags A1-A11-A111, one incorrect-answer tag A1-A12-A123, one incorrect-answer tag A1-A12-A124, and one incorrect-answer tag A1-A11-A112, the data analysis system: may designate questions, to which one of the tags {A1-A11-A111, A1-A11-A112, A1-A11-A113, A1-A11-A114, A1-A11-A111-A1111, A1-A11-A111-A1112, . . . } belonging to the relevant analysis group is indexed as a core tag, as a recommended group; and may designate, as a recommended question, a question of which an incorrect-answer tag configuration is the most similar to two incorrect-answer tags A1-A11-A111, one incorrect-answer tag A1-A12-A123, one incorrect-answer tag A1-A12-A124, and one incorrect-answer tag A1-A11-A112 among questions included in the recommended group.

In this configuration, according to an embodiment of the present disclosure, a question having a pattern value similar to that of the question, to which the user frequently gives the incorrect answer, may be determined as a recommended question by using the question type classification, that is, the structural information of a question, generated in operation 250 of FIG. 2.

Meanwhile, according to another embodiment of the present disclosure, a question related to an analysis group of which user information is not sufficiently accumulated may be recommended. When user information of multiple analysis groups is not sufficient, it is possible to first recommend a question to which a tag, for which the amount of user information to be collected is the smallest, is indexed as a core tag. This is because the understanding of accurate user information is essential for effective recommendation of a question.

The embodiments disclosed in the present disclosure and the drawings are merely particular embodiments provided to easily describe technical details of the present disclosure and to help the understanding of the present disclosure, and are not intended to limit the scope of the present disclosure. It will be apparent to those having ordinary knowledge in the technical field to which the present disclosure pertains that it is possible to practice other modified embodiments, which are based on the technical idea of the present disclosure, in addition to the embodiments disclosed herein.

INDUSTRIAL APPLICABILITY

A method and an apparatus for providing a customized educational content, and a computer program according to the present disclosure can be widely utilized in the fields of learning and an educational content provided by a computer or an electronic device.

The invention claimed is:
1. A method for providing a customized educational content by an electronic device, the method comprising:
   a step a of generating, with a processor of the electronic device, a set of tags of sub-learning elements by listing a learning element of a particular subject in a tree structure, and designating analysis groups of the tags;
   a step b of generating, with the processor of the electronic device, structural information for each question of a plurality of questions by indexing an incorrect-answer tag to each of distractors of each question and by indexing a core tag for an intention of writing each question to each question;

a step c of determining, with the processor of the electronic device, a result of a user test taken on the electronic device by classifying one or more test questions of the user test into at least one incorrect question to which a user has given an incorrect answer and indexing the incorrect-answer tag and the core tag to the at least one incorrect question that was classified as incorrect and calculating, with a server, a user conquest rate for each of the analysis groups, wherein calculating the user conquest rate for each of the analysis groups, when the user has given the at least one incorrect answer, comprises: assigning, with a first identical importance, a first weight to each of a core distractor having a corresponding incorrect-answer tag identical to the core tag and a first distractor selected by the user, when the first distractor selected by the user has multiple incorrect-answer tags, assigning second weights, which are obtained by distributing the first weight among the multiple incorrect answer tags in a first identical ratio to the multiple incorrect-answer tags, respectively, calculating first incorrect-answer-tag-specific weights by combining the first and second weights with respect to incorrect-answer tags of the core distractor and the first distractor selected by the user, and diluting an initial conquest rate before being changed for the corresponding incorrect-answer tags of the core distractor and the first distractor selected by the user and incorporating the calculated first incorrect-answer-tag-specific weights into the diluted initial conquest rate to calculate the user conquest rate; and a step d of, based on the user conquest rate for each of the analysis groups, determining, with the processor of the electronic device, one or more weak analysis groups, in which the user conquest rate was below a threshold, generating, with the processor of the electronic device using one or more machine learning algorithms, a pattern of new questions to which a tag belonging to the one or more weak analysis groups in which the user conquest rate is below the threshold is indexed as the core tag of each new question and providing, with the processor of the electronic device, each new question in the pattern of new questions to the user.

2. The method as claimed in claim 1, wherein the step c comprises:

classifying one or more test questions of the user test into at least one correct question to which the user has given a correct answer, and indexing the incorrect-answer tag and the core tag to the at least one correct question that was classified as correct;

in a case of the at least one correct question to which the user has given the correct answer, assigning a third weight to the core distractor, having only a corresponding incorrect-answer tag identical to the core tag, with a second importance identical to a second importance of all remaining distractors, assigning fourth weights, which are obtained by distributing the third weight among one or more remaining distractors in a second identical ratio, to the one or more remaining distractors respectively, when each of the remaining distractors has multiple corresponding incorrect-answer tags, assigning fifth weights, which are obtained by distributing the fourth weight among the multiple corresponding incorrect-answer tags in a third identical ratio, to the multiple corresponding incorrect-answer tags, respectively;

calculating second incorrect-answer-tag-specific weights by combining the third, fourth, and fifth weights with respect to all corresponding incorrect-answer tags of the one or more test questions to which the user has given the correct answer; and diluting the initial conquest rate before being changed for the corresponding incorrect-answer tags of the one or more test questions to which the user has given the correct answer, and incorporating the calculated second incorrect-answer-tag-specific weights into the diluted initial conquest rate to calculate the user conquest rate.

3. A computer program recorded in a non-transitory computer-readable recording medium in order to perform processing for providing a customized educational content in an electronic device, the computer program comprising:

a first function of generating a set of tags of sub-learning elements by listing a learning element of a particular subject in a tree structure, and designating analysis groups of the tags;

a second function of generating structural information for each question of a plurality of questions by indexing an incorrect-answer tag to each of distractors of each question and by indexing a core tag for an intention of writing each question to each question;

a third function of determining a result of a user test taken on the electronic device by classifying one or more test questions of the user test into at least one incorrect question to which a user has given an incorrect answer and indexing the incorrect-answer tag and the core tag to the at least one incorrect question that was classified as incorrect and calculating a user conquest rate for each of the analysis wherein calculating the user conquest rate for each of the analysis groups, when the user has given the at least one incorrect answer, comprises: assigning, with a first identical importance, a first weight to each of a core distractor having a corresponding incorrect-answer tag identical to the core tag and a first distractor selected by the user, when the first distractor selected by the user has multiple incorrect-answer tags, assigning second weights, which are obtained by distributing the first weight among the multiple incorrect answer tags in a first identical ratio to the multipack incorrect-answer tags, respectively, calculating first incorrect-answer-tag-specific weights by combining the first and second weights with respect to incorrect-answer tags of the core distractor and the first distractor selected by the user, and diluting an initial conquest rate before being changed for the corresponding incorrect-answer tags of the core distractor and the first distractor selected by the user and incorporating the calculated first incorrect-answer-tag-specific weights into the diluted initial conquest rate to calculate the user conquest rate; and a fourth function of, based on the user conquest rate for each of the analysis groups, determining, one or more weak analysis groups, in which the user conquest rate was below a threshold, generating, using one or more machine learning algorithms, a pattern of new questions to which a tag belonging to the one or more weak analysis groups in which the user conquest rate is below the threshold is indexed as the core tag of each new question and providing each new question in the pattern of new questions to the user.

4. The computer program as claimed in claim 3, wherein the third function further comprises:

classifying one or more test questions of the user test into at least one correct question to which the user has given a correct answer, and indexing the incorrect-answer tag and the core tag to the at least one correct question that was classified as correct;

in a case of the at least one correct question to which the user has given the correct answer, assigning a third weight to the core distractor, having only a corresponding incorrect-answer tag identical to the core tag, with a second importance identical to a second importance of all remaining distractors, assigning fourth weights, which are obtained by distributing the third weight among one or more remaining distractors in a second identical ratio, to the one or more remaining distractors respectively, when each of the remaining distractors has multiple corresponding incorrect-answer tags, assigning fifth weights, which are obtained by distributing the fourth weight among the multiple corresponding incorrect-answer tags in a third identical ratio, to the multiple corresponding incorrect-answer tags, respectively;

calculating second incorrect-answer-tag-specific weights by combining the third, fourth, and fifth weights with respect to all corresponding incorrect-answer tags of the one or more test questions to which the user has given the correct answer; and diluting the initial conquest rate before being changed for the corresponding incorrect-answer tags of the one or more test questions to which the user has given the correct answer, and incorporating the calculated second incorrect-answer-tag-specific weights into the diluted initial conquest rate to calculate the user conquest rate.

\* \* \* \* \*